US011091198B2

(12) United States Patent
Bodtker et al.

(10) Patent No.: US 11,091,198 B2
(45) Date of Patent: Aug. 17, 2021

(54) ENERGY ABSORPTION STRAP ASSEMBLY FOR STEERING COLUMN

(71) Applicant: STEERING SOLUTIONS IP HOLDING CORPORATION, Saginaw, MI (US)

(72) Inventors: Joen C. Bodtker, Gaines, MI (US); Randy Jones, North Branch, MI (US); Jorge Flores, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 405 days.

(21) Appl. No.: 16/146,670

(22) Filed: Sep. 28, 2018

(65) Prior Publication Data

US 2019/0100242 A1     Apr. 4, 2019

Related U.S. Application Data

(60) Provisional application No. 62/565,635, filed on Sep. 29, 2017.

(51) Int. Cl.
*B62D 1/19*   (2006.01)
*B62D 7/22*   (2006.01)
*F16F 7/12*   (2006.01)

(52) U.S. Cl.
CPC ............... *B62D 7/22* (2013.01); *B62D 1/195* (2013.01); *F16F 7/123* (2013.01)

(58) Field of Classification Search
CPC .............. F16F 1/361; F16F 7/12; B62D 1/195
USPC .................................. 74/492, 493; 280/777
See application file for complete search history.

(56) References Cited

U.S. PATENT DOCUMENTS

| | | | | |
|---|---|---|---|---|
| 6,478,333 B1* | 11/2002 | Barton | ..... | B62D 1/195 188/371 |
| 9,669,862 B1* | 6/2017 | Dubay | ..... | B62D 1/195 |
| 9,834,246 B1* | 12/2017 | Woycik | ..... | B62D 1/192 |
| 10,464,590 B2* | 11/2019 | Stinebring | ..... | B62D 1/185 |
| 2003/0006601 A1* | 1/2003 | Byers | ..... | B62D 1/195 280/777 |
| 2003/0042723 A1* | 3/2003 | Riefe | ..... | B62D 1/195 280/777 |
| 2006/0033321 A1* | 2/2006 | Manwaring | ..... | B62D 1/195 280/777 |
| 2009/0033082 A1* | 2/2009 | Klukowski | ..... | F16F 1/361 280/777 |
| 2018/0327019 A1* | 11/2018 | Bodtker | ..... | B62D 1/184 |

* cited by examiner

*Primary Examiner* — Toan C To
(74) *Attorney, Agent, or Firm* — Dickinson Wright PLLC (57) ABSTRACT

An energy absorption strap assembly for a steering column includes a first strap. Also included is a second strap, the first and second strap having respective edge regions that are laterally engageable with each to switch the energy absorption strap assembly between a high load condition and a low load condition.

19 Claims, 8 Drawing Sheets

ENERGY ABSORPTION STRAP ASSEMBLY FOR STEERING COLUMN

CROSS-REFERENCE TO RELATED APPLICATIONS

This patent application claims priority to U.S. Provisional Patent Application Ser. No. 62/565,635, filed Sep. 29, 2017, the disclosure of which is incorporated herein by reference in its entirety.

BACKGROUND

The embodiments described herein relate generally to steering columns and, more particularly, to an energy absorption strap assembly for steering columns.

Some energy absorbing steering columns provide two states of energy absorption. For example, if the passenger is unbelted it may be desired to absorb more energy in the steering column as it is collapsed due to an energy absorbing event (e.g., a collision). If the occupant is belted to the seat, less energy dissipated by the steering column may be adequate.

A switching mechanism is required to select between the high and low energy modes. One arrangement for the switching mechanism is to attach it to energy absorption straps that are part of the energy absorbing steering column. Thus, as the steering column is adjusted for ergonomic considerations, the switching mechanism must travel in the telescope direction along with the energy absorption strap and jacket assembly.

This requires space along the length of the steering column between brackets. If a clamping mechanism in the steering column is moved to be coplanar with the steering shaft (e.g., on-center lever), there is less space available to place the switching mechanism. It is not uncommon to structurally compromise the lower jacket to fit the switching mechanism into the column.

SUMMARY OF INVENTION

In accordance with one aspect of the disclosure, an energy absorption strap assembly for a steering column includes a first strap. Also included is a second strap, the first and second strap having respective edge regions that are laterally engageable with each to switch the energy absorption strap assembly between a high load condition and a low load condition.

According to another aspect of the disclosure, an energy absorption strap assembly for a steering column includes a first strap extending from a first end to a second end, the first strap including a curved portion between the first end and the second end of the first strap, the first strap having a lateral edge with a first plurality of teeth. Also included is a second strap extending from a first end to a second end, the second strap including a curved portion between the first end and the second end of the second strap, the second strap having a lateral edge with a second plurality of teeth, the first and second plurality of teeth laterally engaged with each other to define a high load condition, the first and second plurality of teeth laterally disengaged from each other to define a low load condition.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is an energy absorption (EA) strap control assembly for a vehicle steering column. As described herein, the EA strap control assembly is implemented in a two-stage EA strap system. The system includes two EA straps selectively engageable with each other. The EA straps are configured to be in an engaged condition, with one of the EA straps capable of disengaging to modify the energy absorption load capabilities. The EA straps are in the engaged condition when a higher energy absorption capability (may be referred to as a high load mode or high load condition) is desired and in the disengaged condition when a lower energy absorption capability (may be referred to as a low load mode or a low load condition) is desired.

Referring now to FIGS. 1-4, an EA strap assembly is illustrated and generally referenced with numeral 10. The EA strap assembly 10 is operatively coupled to one or more components of a steering column assembly. The steering column assembly includes an upper jacket 12 and a lower jacket (not shown) that are telescopingly engaged with each other in an axial direction (i.e., longitudinal direction of steering column).

The steering column may be used in any type of vehicle that requires steering operation. A mounting bracket is operatively coupled to the steering column to allow adjustment or relative motion of components of the steering column. Adjustment is facilitated by manipulation of an adjustment lever that is operatively coupled to the lower jacket. Actuation of the adjustment lever allows a user to switch the steering column between a locked condition and an unlocked condition. In the unlocked condition, a user is able to telescopingly adjust the upper jacket 12 relative to the lower jacket to suit the user's preference. In the locked condition, relative movement of components of the steering column is inhibited.

As shown in FIGS. 3-7, the EA strap assembly 10 includes a first energy absorption strap (first EA strap) 14 and a second energy absorption strap (second EA strap) 16. As will be appreciated from the disclosure herein, the first EA strap 14 may be referred to as a main strap or an inner strap, while the second EA strap 16 may be referred to as an auxiliary strap, secondary strap, or an outer strap. The EA straps 14, 16 each absorb energy during a collapse event of the steering column. Respective mechanisms engage the EA straps 14, 16 to maintain the straps in an engaged condition that absorbs energy during a collapse event, as described herein. In particular, an eccentric cam 13 is coupled to the lower jacket and rotates about an axis. The eccentric cam 13 is engageable with the first EA strap 14 to lock the first EA strap 14 when the steering column position is locked (i.e., with locking of adjustment lever) to place the EA strap assembly 10 in the engaged condition. However, when a lower energy absorption load is required, only one of the EA straps is required to be engaged, that being the first EA strap 14 in the illustrated embodiments.

The first EA strap 14 is coupled to the upper jacket 12 proximate an upper portion thereof. However, it is to be appreciated that the EA straps 14, 16 may be positioned at any location around the steering column, such as on sides of the column, as well as on an upper or lower portion of the column. As shown, the first EA strap 14 extends from a first end 18 to a second end 20. The first EA strap 14 includes a curved portion 22 between the first end 18 and the second end 20. Proximate the second end 20 of the first EA strap 14 is at least one mounting portion 24 that facilitates coupling to the upper jacket 12, directly or indirectly.

The second EA strap 16 extends from a first end 32 to a second end 34, with a curved portion 36 being located therebetween. The curved portion 36 of the second EA strap 16 is positioned in a nested orientation with the curved portion 22 of the first EA strap 14 in the illustrated embodiment. The terms inner strap and outer strap refer to the relative positioning of the "nested" orientation of the EA straps 14, 16. In particular, the inner strap 14 is surrounded by the outer strap 16. Although illustrated and described as being in the nested orientation, the EA straps 14, 16 may be in a parallel arrangement.

The embodiments described herein "nests" a rolling portion of the EA straps 14, 16. In particular, rather than disposing an entirety of an inner EA strap within an outer EA strap, only the rolling portion (i.e., curved portion 22) of the inner strap 14 is disposed within the outer EA strap 16 in a nested manner. This is done to economize the space claimed by the EA strap assembly 10 within the steering column. The EA straps un-nest and are formed to adjoin each other in a parallel arrangement for a low load crash. In other words, in the area of adjoinment of the EA straps, a substantially co-planar relative orientation is present and the EA straps are laterally engaged with each other. The laterally engageable portion of the first EA strap 14 is referenced with numeral 40 and the laterally engageable portion of the second EA strap 16 is referenced with numeral 42.

Figure 1:
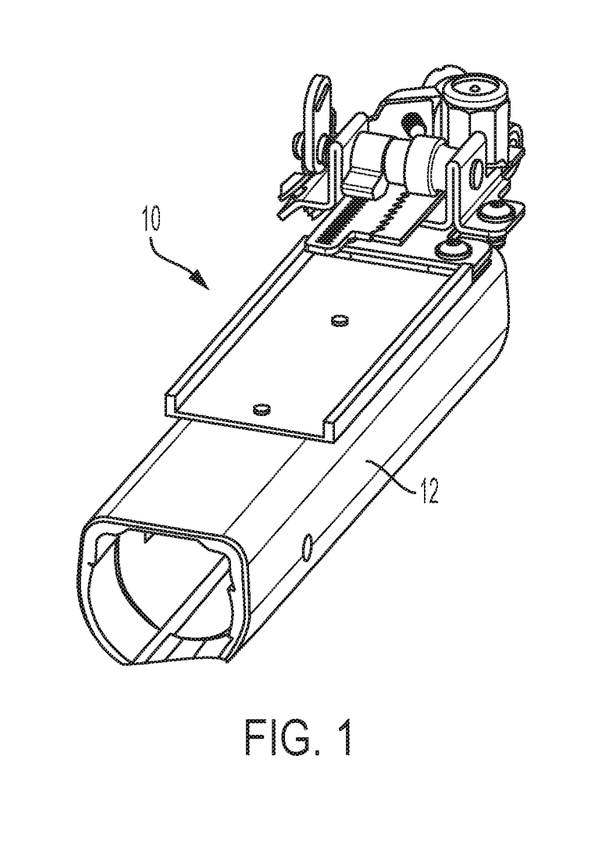
FIG. 1 is a front perspective view of an energy absorption strap assembly for a vehicle steering column according to an aspect of the disclosure.
Figure 2:
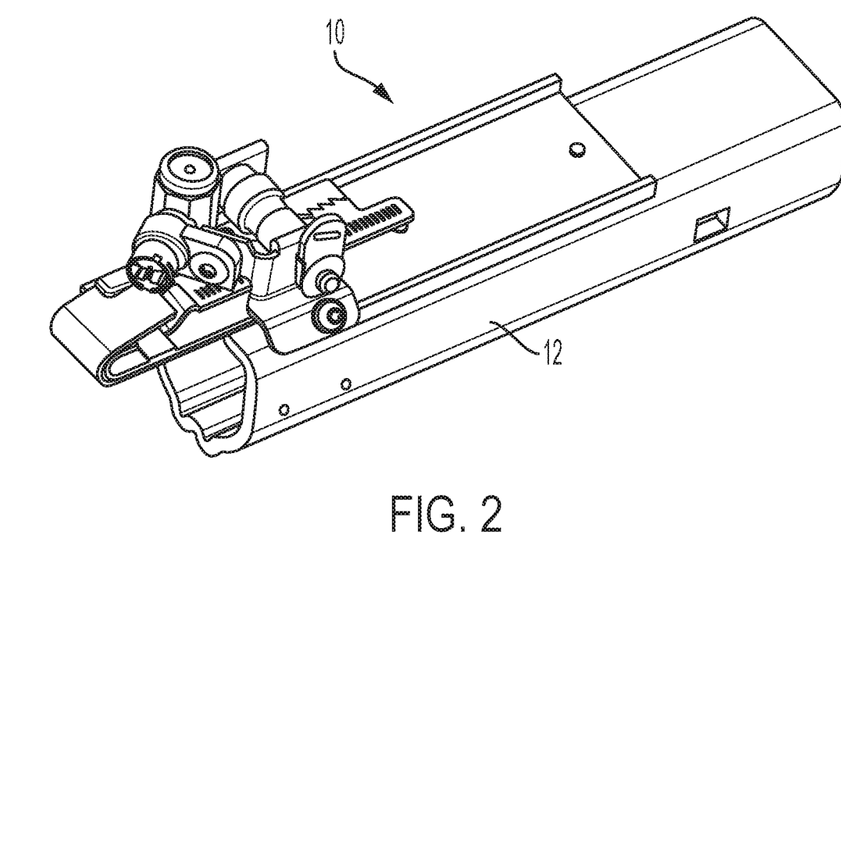
FIG. 2 is a rear perspective view of the energy absorption strap assembly of FIG. 1.
Figure 3:
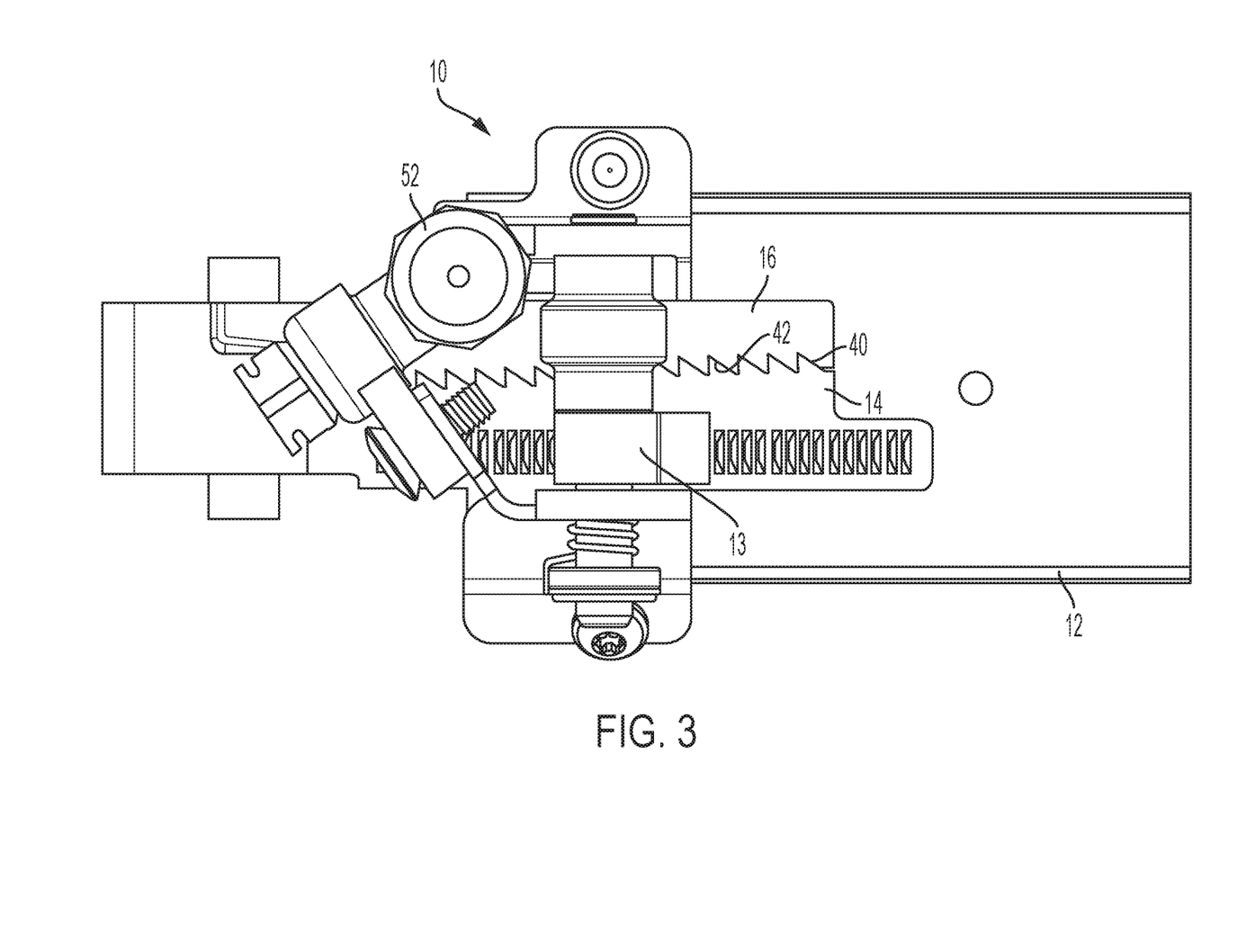
FIG. 3 is a top plan view of the energy absorption strap assembly of FIG. 1.
Figure 4:
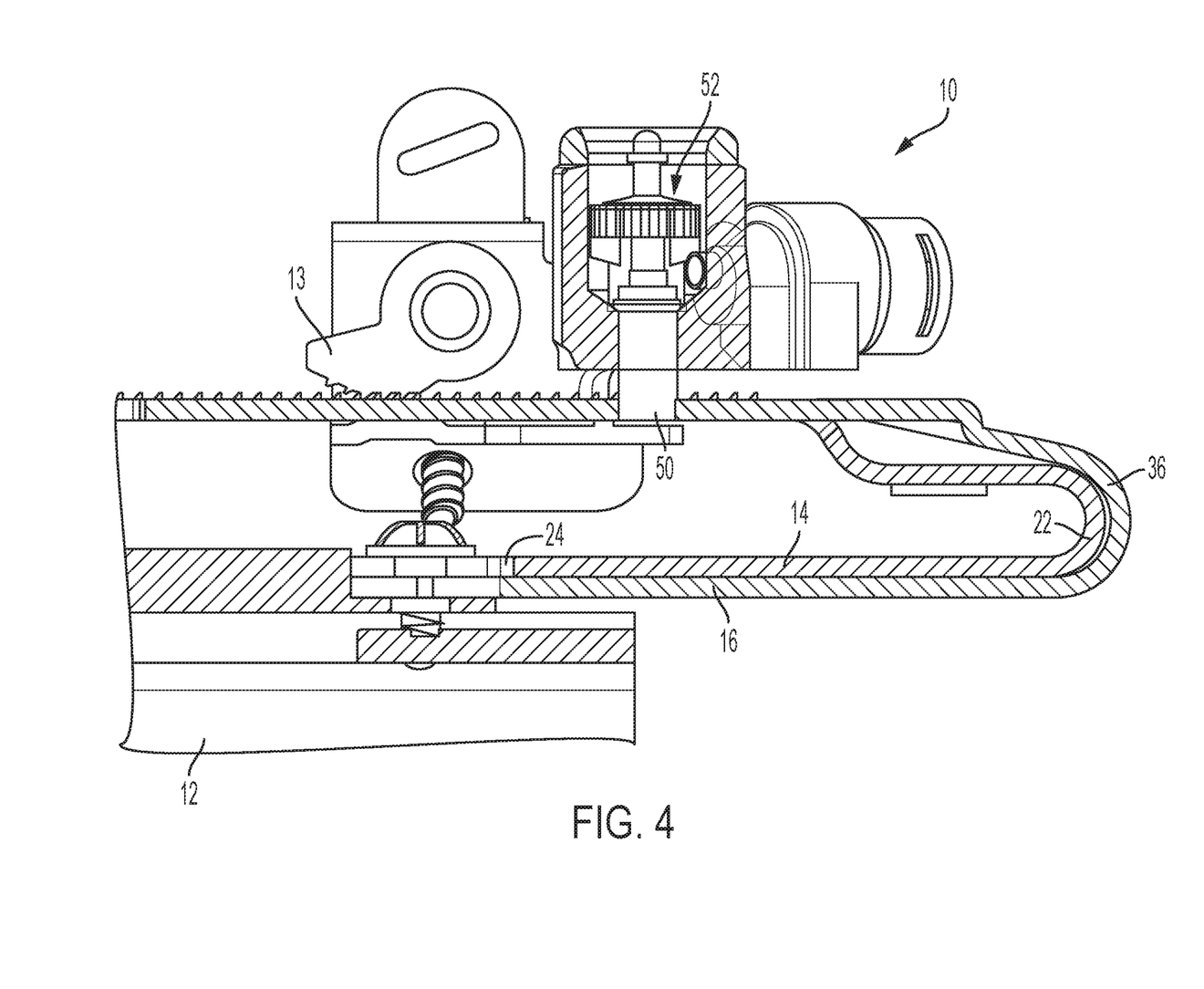
FIG. 4 is a side sectional view of the energy absorption strap assembly of FIG. 1.
Figure 5:
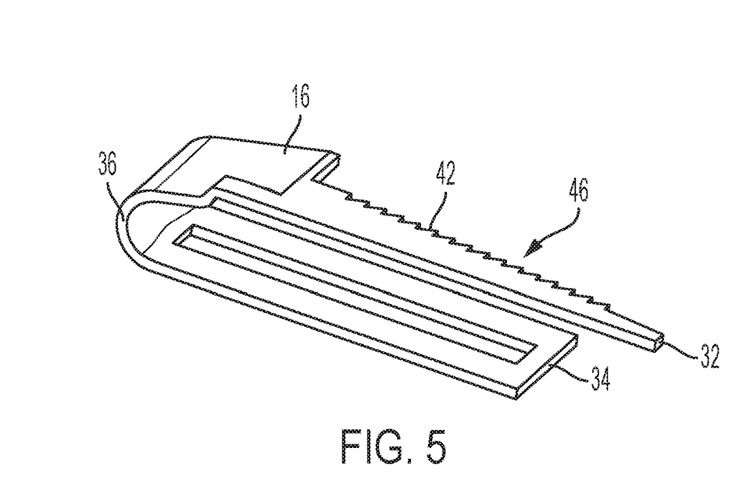
FIG. 5 is a perspective view of an energy absorption strap.
Figure 6:
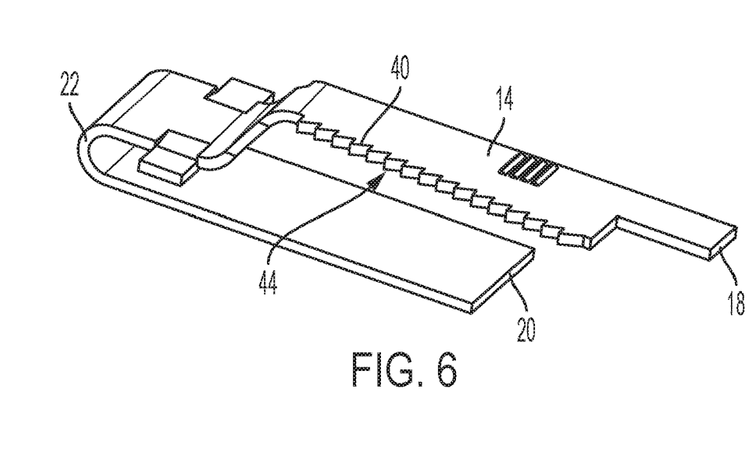
FIG. 6 is a perspective view of another energy absorption strap.
Figure 7:
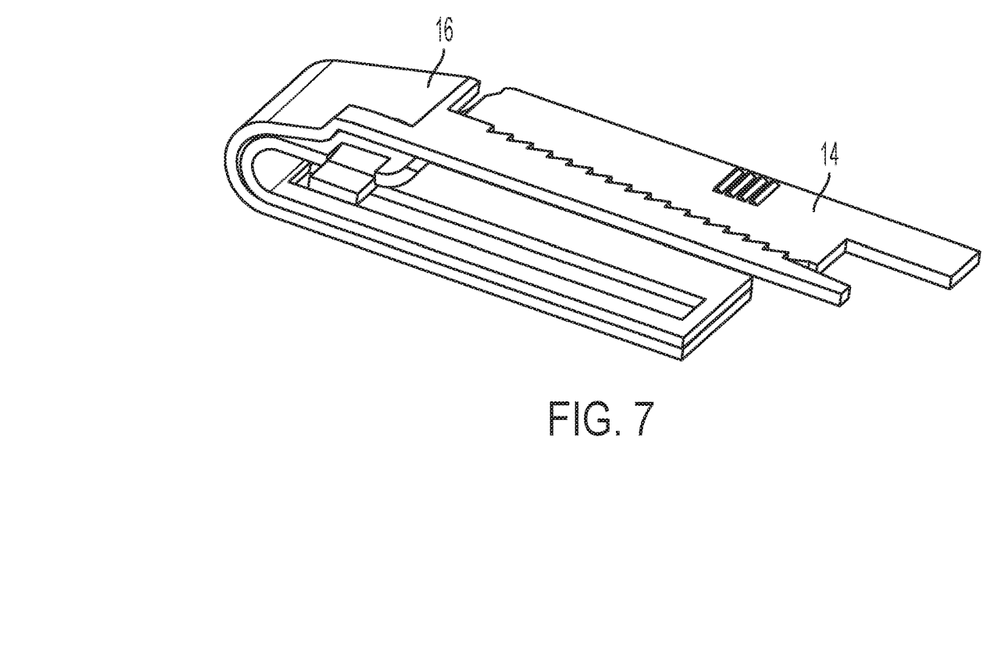
FIG. 7 is a perspective view of the energy absorption straps laterally engaged with each other.

Along the area of adjoinment of the EA straps (i.e., portions 40, 42), a meshing sawtooth pattern is provided on each EA strap. In particular, engageable portion 40 includes a first plurality of teeth 44 and engageable portion 42 includes a second plurality of teeth 46. Each sawtooth of has a flank angle on one side and is substantially flat on the reverse side of the sawtooth. The flat portion of the sawtooth extends substantially perpendicular to a longitudinal direction of each EA strap (i.e., 0 degrees from an axis oriented perpendicularly to the longitudinal direction of the EA straps). The flank angle may be different in various applications of use. In one example, the flank angle is about 60 degrees, relative to the axis perpendicular to the longitudinal direction of the EA straps. The tooth height may vary depending upon the application, but can be in the 2 mm to 4 mm range to ensure ample engagement between the EA straps even in a loose-fitting build condition.

On the second EA strap 16 along the edge opposite of the sawteeth, a locking pin 50 is juxtaposed. The locking pin 50 may be part of—and extends from—any inhibiting pin device 52, such as a pyro device, a solenoid, etc. This facilitates two modes of operation, a high load mode and a low load mode. The load mode is determined by positioning of the locking pin 50 that is extendable and retractable. In an extended position, the locking pin 50 is adjacent the second EA strap 16 to maintain engagement of the first and second plurality of teeth 44, 46. The extended position defines the high load mode. A retracted position removes the locking pin 50 from abutment with the second EA strap 16 to define the low load mode, as the second EA strap 16 teeth are disengaged from the first EA strap 14 teeth.

In high load state, when the higher energy absorbing load is required, the pin protrudes from the inhibiting pin device, thus keeping the sawteeth 44, 46 in mesh between the auxiliary and main straps by laterally constraining a side of the second EA strap 16. The sawteeth 44, 46 synchronize the EA straps 14, 16 during ergonomic adjustment of the upper jacket 12. During an energy absorbing event, the engagement teeth on the main strap 14 fixes the main strap to the lower jacket via the eccentric cam 13, thus forcing the strap 14 to unroll due to motion of the upper jacket 12. When the auxiliary strap 16 is locked to the main strap 14, it also unrolls due to the motion of the upper jacket 12. Thus, the higher energy absorbing state is achieved.

When the lower energy load is required, the pyro switch is activated, thus retracting the locking pin 50 and removing it from contact with the auxiliary strap 16, thereby removing the lateral constraint on the auxiliary EA strap 16. As the upper jacket 12 begins to stroke, it will pull the auxiliary strap 16 with it while the main strap 14 is locked to the lower jacket. This relative motion between the EA straps will cause the sawteeth 44, 46 to engage on their angled flanks. This engagement will cam the auxiliary strap 16 away from the main strap 14. Because the locking pin 50 is not there to restrict strap separation, the auxiliary strap 16 will travel with the upper jacket 12 without rolling, thus not absorbing additional energy.

To prevent inadvertent disengagement of the straps 14, 16 in the direction normal to the plane of the straps (i.e., lateral withdrawal), an element may be placed over the EA straps. A sliding interface may be provided with a stationary block, or a rolling element concentric with the locking eccentric cam may be used.

Figure 8:
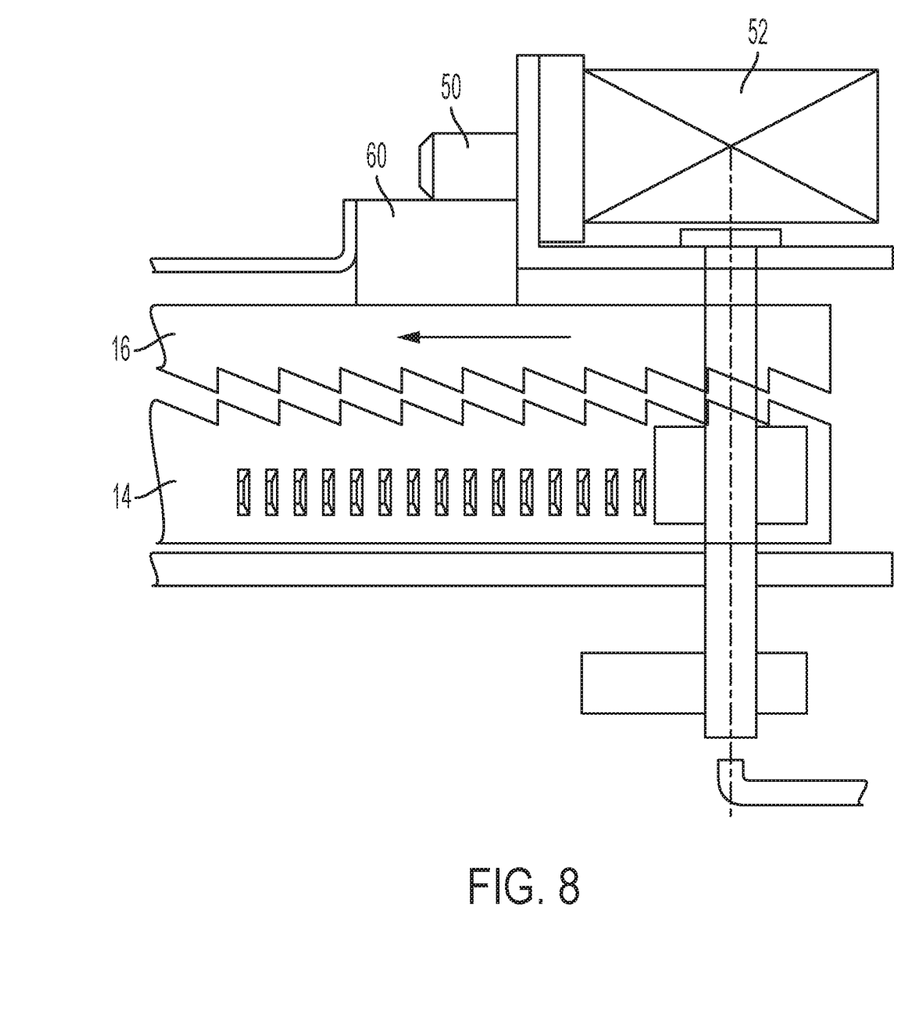
FIG. 8 illustrates the energy absorption strap assembly according to another aspect of the disclosure.

As shown in FIG. 8, if the inhibiting pin device 52 cannot be located immediately next to the auxiliary strap 16, a sliding inhibitor block 60 will serve to more remotely position it as packaging requirements dictate. The inhibiting pin device 52 does not change position to provide a stationary unit that does not require space for translation thereof.

Figure 9:
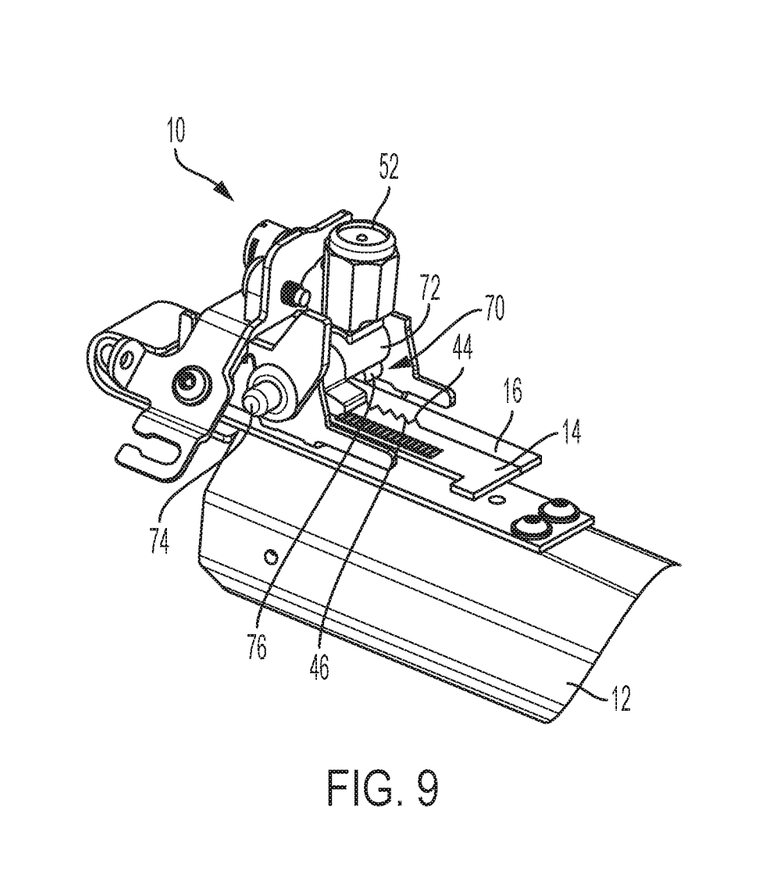
FIG. 9 is a front perspective view of the energy absorption strap assembly according to another aspect of the disclosure.
Figure 10:
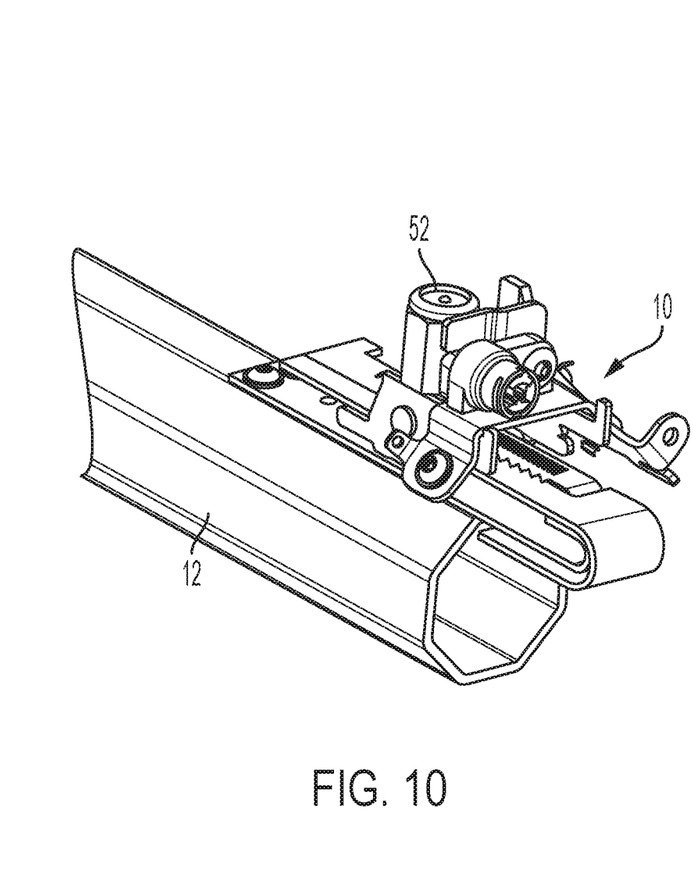
FIG. 10 is a rear perspective view of the energy absorption strap assembly of FIG. 9.
Figure 11:
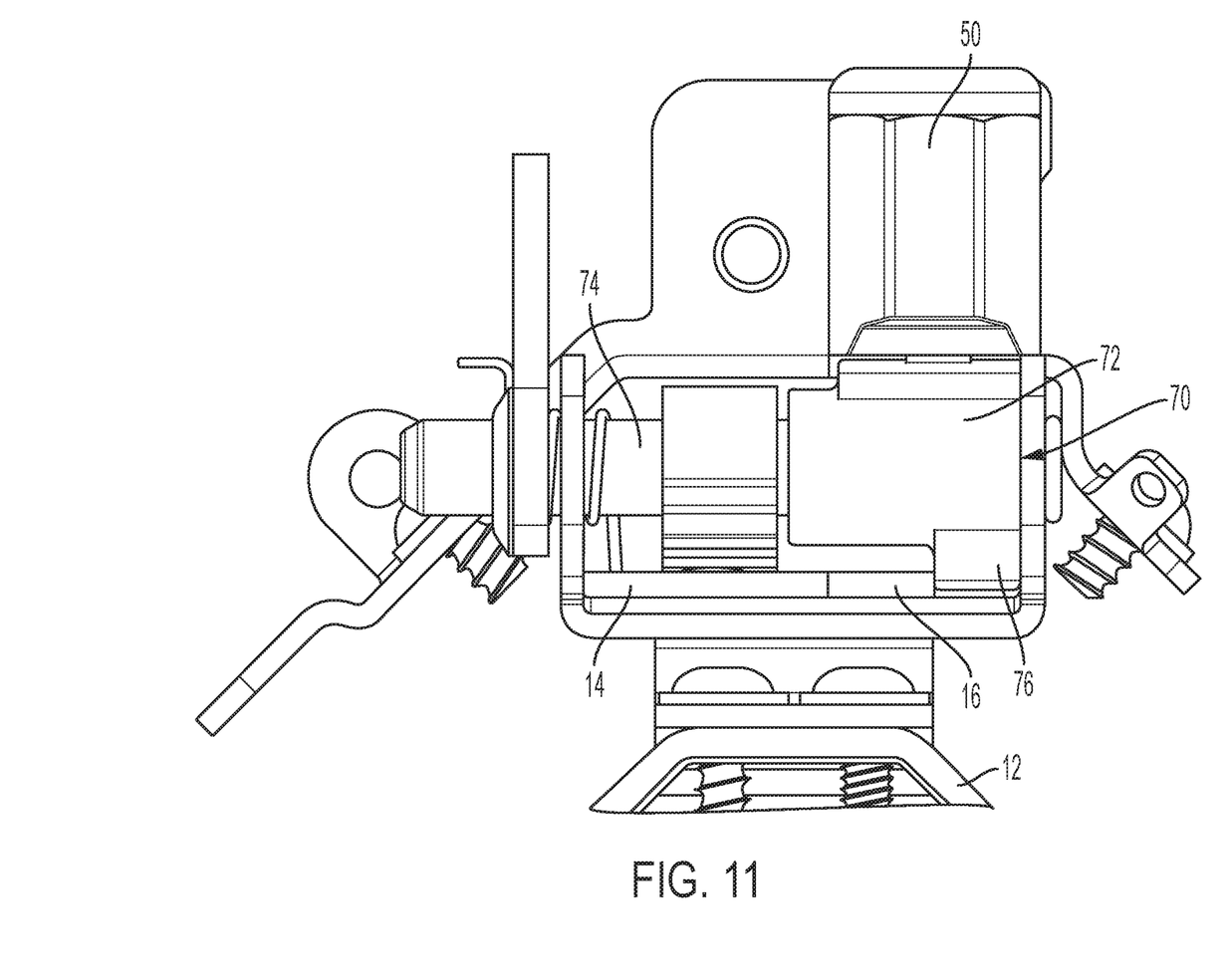
FIG. 11 is a rear elevational view of the energy absorption strap assembly of FIG. 9.
Figure 12:
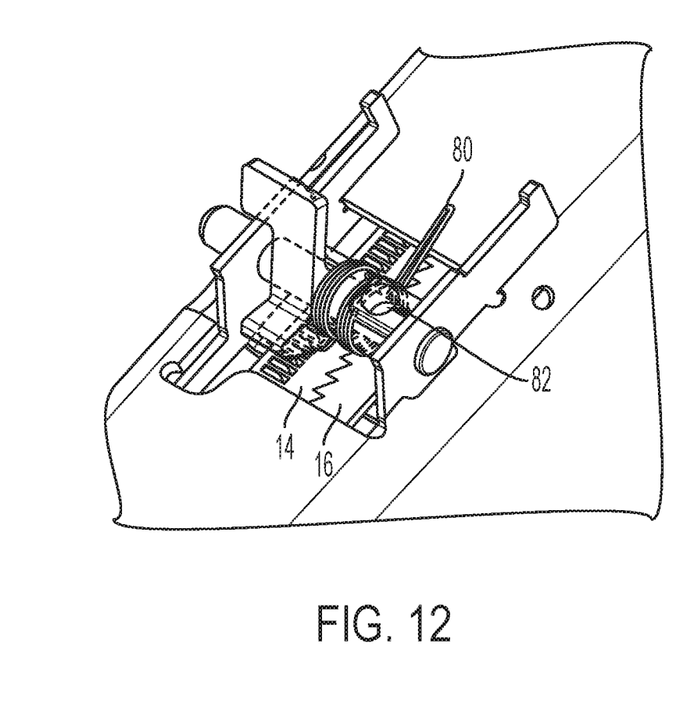
FIG. 12 is a perspective view of the energy absorption strap assembly of FIG. 9 illustrating a spring element.
Figure 13:
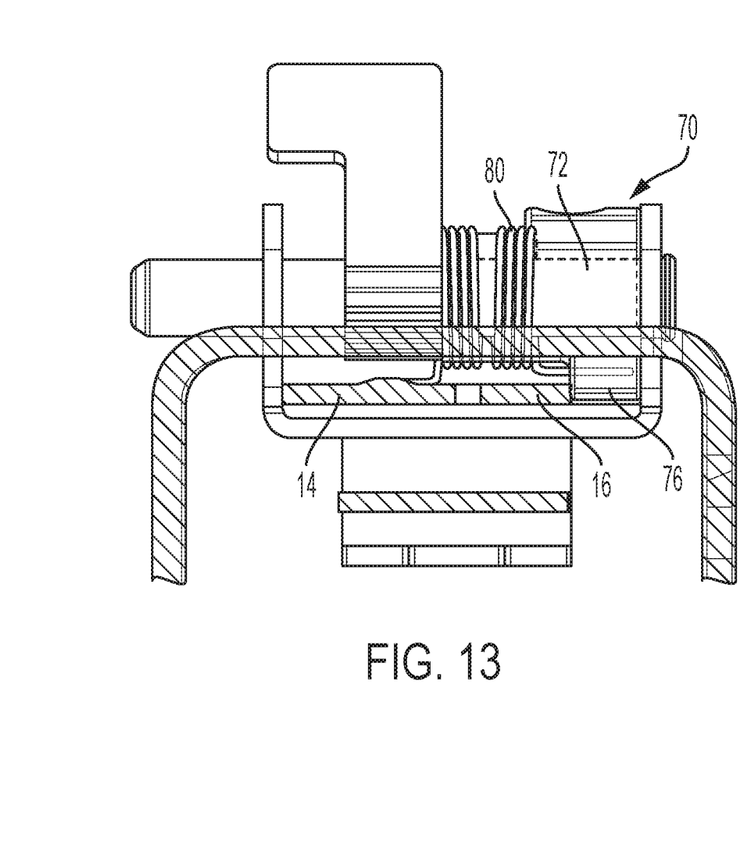
FIG. 13 is a rear sectional view of the energy absorption strap assembly of FIG. 9 illustrating the spring element.

Referring now to FIGS. 9-11, engagement and disengagement of the teeth 44, 46 of the EA straps 14, 16 is controlled by a spacer 70. The spacer 70 is a rotary strap inhibiter that includes a cylindrical base 72 that is rotatable about pin 74. A tab 76 extends from the cylindrical base 72 to selectively be in contact with the edge of the second EA strap 16 that is opposite teeth 46. As shown in FIGS. 12 and 13, a spring element surrounds the pin 74 and is engaged with spacer 70 to bias the spacer 70 to rotate out of engagement with the second EA strap 16. Rotation away from the second EA strap 16 allows the teeth 46 of the second EA strap 16 to disengage from the teeth 44 of the first EA strap 14, thereby providing the low load condition of the assembly 10.

The locking pin 50 that is actuated by the inhibiting pin device 52 extends to lock the spacer 70 in a position that keeps the EA straps 14, 16 engaged via teeth 44, 46. As shown in FIG. 12, spacer 70 includes a recess or aperture 80 that receives the locking pin 50.

The embodiments described herein provide a switching mechanism that requires less space than that of previous designs, in some cases about half of prior requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An energy absorption strap assembly for a steering column, the energy absorption strap assembly comprising:
   a first strap; and
   a second strap, the first and second strap having respective edge regions that are laterally engageable with each other to switch the energy absorption strap assembly between a high load condition and a low load condition, wherein each of the edge regions include a plurality of teeth, the plurality of teeth engaged with each other in the high load condition and disengaged from each other in the low load condition.

2. The energy absorption strap assembly of claim 1, further comprising a locking pin moveable between a first position and a second position, the first position laterally constraining the second strap into lateral engagement with the first strap to provide the high load condition.

3. The energy absorption strap assembly of claim 2, wherein the locking pin is directly engageable with the second strap.

4. The energy absorption strap assembly of claim 2, wherein the locking pin is engageable with a block in abutment with the second strap.

5. The energy absorption strap assembly of claim 2, further comprising a rotatable spacer that is rotatable between a first angular position and a second angular position, the first angular position disposing a tab extending from the rotatable spacer into contact with the second strap.

6. The energy absorption strap assembly of claim 5, wherein the rotatable spacer is biased toward the second angular position with a spring element in contact with the rotatable spacer.

7. The energy absorption strap assembly of claim 5, wherein the rotatable spacer includes a receiving feature to receive the locking pin to retain the rotatable spacer in the first angular position.

8. The energy absorption strap assembly of claim 2, wherein the position of the pin is controlled by a inhibiting pin device.

9. The energy absorption strap assembly of claim 8, wherein the inhibiting pin device is operatively coupled to a stationary component of the steering column.

10. An energy absorption strap assembly for a steering column, the energy absorption strap assembly comprising:
    a first strap; and
    a second strap, the first and second strap having respective edge regions that are laterally engageable with each other to switch the energy absorption strap assembly between a high load condition and a low load condition, wherein the first strap extends from a first end to a second end, the first strap including a curved portion between the first end and the second end of the first strap, the second strap extending from a first end to a second end, the second strap including a curved portion between the first end and the second end of the second strap.

11. The energy absorption strap assembly of claim 10, wherein the curved portion of the second strap surrounds the curved portion of the first strap.

12. An energy absorption strap assembly for a steering column, the energy absorption strap assembly comprising:
    a first strap extending from a first end to a second end, the first strap including a curved portion between the first end and the second end of the first strap, the first strap having a lateral edge with a first plurality of teeth; and
    a second strap extending from a first end to a second end, the second strap including a curved portion between the first end and the second end of the second strap, the curved portion of the second strap surrounding the curved portion of the first strap, the second strap having a lateral edge with a second plurality of teeth, the first and second plurality of teeth laterally engaged with each other to define a high load condition, the first and second plurality of teeth laterally disengaged from each other to define a low load condition.

13. The energy absorption strap assembly of claim 12, further comprising a locking pin moveable between a first position and a second position, the first position laterally constraining the first strap and the second strap into the high load condition.

14. The energy absorption strap assembly of claim 13, wherein the locking pin is directly engageable with a lateral edge of the second strap that is on an opposing side of the second plurality of teeth.

15. The energy absorption strap assembly of claim 13, wherein the locking pin is engageable with a block in abutment with a lateral edge of the second strap that is on an opposing side of the second plurality of teeth.

16. The energy absorption strap assembly of claim 13, further comprising a rotatable spacer that is rotatable between a first angular position and a second angular position, the first angular position disposing a tab extending from the rotatable spacer into contact with a lateral edge of the second strap that is on an opposing side of the second plurality of teeth.

17. The energy absorption strap assembly of claim 16, wherein the rotatable spacer is biased toward the second angular position with a spring element in contact with the rotatable spacer.

18. The energy absorption strap assembly of claim 16, wherein the rotatable spacer includes a receiving feature to receive the locking pin to retain the rotatable spacer in the first angular position.

19. The energy absorption strap assembly of claim 13, wherein the position of the locking pin is controlled by an inhibiting pin device.

* * * * *